(12) United States Patent
Bruzzone (10) Patent No.: US 11,208,231 B2
(45) Date of Patent: Dec. 28, 2021

(54) TRANSPORTATION APPARATUS FOR QUARRY AND METHODS OF USING SAME

(71) Applicant: Dennis Bruzzone, Wanaque, NJ (US)

(72) Inventor: Dennis Bruzzone, Wanaque, NJ (US)

( * ) Notice: Subject to any disclaimer, the term of this patent is extended or adjusted under 35 U.S.C. 154(b) by 0 days.

(21) Appl. No.: 15/043,033

(22) Filed: Feb. 12, 2016

(65) Prior Publication Data

US 2016/0236623 A1    Aug. 18, 2016

Related U.S. Application Data

(60) Provisional application No. 62/115,673, filed on Feb. 13, 2015.

(51) Int. Cl.
| | | |
|---|---|---|
| *B65D 1/38* | (2006.01) | |
| *A01M 31/00* | (2006.01) | |
| *B62B 1/22* | (2006.01) | |

(52) U.S. Cl.
CPC ............. *B65D 1/38* (2013.01); *A01M 31/006* (2013.01); *B62B 1/22* (2013.01)

(58) Field of Classification Search
CPC .............................. B65D 1/38; A01M 31/006
See application file for complete search history.

(56) References Cited

U.S. PATENT DOCUMENTS

| | | | |
|---|---|---|---|
| 3,822,801 A | | 7/1974 | Morgan, Jr. |
| 4,548,423 A | * | 10/1985 | Craven .................... B60D 1/00 |
| | | | 280/204 |
| 5,018,651 A | * | 5/1991 | Hull .......................... B60R 9/06 |
| | | | 224/280 |
| 5,645,292 A | * | 7/1997 | McWilliams ............. B60P 3/05 |
| | | | 280/47.26 |
| 5,911,556 A | | 6/1999 | Caldwell |
| 6,254,117 B1 | * | 7/2001 | Cross ................... B62D 63/062 |
| | | | 280/401 |
| 6,382,486 B1 | * | 5/2002 | Kretchman ............... B60R 9/06 |
| | | | 224/498 |
| 6,419,244 B2 | * | 7/2002 | Meabon .................. B62B 1/002 |
| | | | 280/47.17 |
| 6,589,004 B2 | | 7/2003 | Reed |
| 6,638,001 B1 | * | 10/2003 | McKinley ............. B60P 1/4407 |
| | | | 224/401 |

(Continued)

FOREIGN PATENT DOCUMENTS

DE         202009014248         4/2010

*Primary Examiner* — Derekj J Battisti
(74) *Attorney, Agent, or Firm* — Rita C. Chipperson; Chipperson Law Group, P.C.

(57) ABSTRACT

Systems and methods for transporting quarry. One apparatus includes a basket with webbing and a pair of handles, a coupler, and a stabilizer. The basket couples to the rear of a vehicle via the coupler and, optionally, a stabilizer installed on the vehicle. The method includes placing the basket into a substantially horizontal position, loading the basket with quarry, fixing the quarry into the basket via webbing, rotating the basket as needed to place the quarry in the proper position, and raising the quarry to a substantially vertical position relative to the back of the vehicle, optionally using the handles for leverage. Once positioned, the basket may be locked in place in a position in which the quarry is not in contact with the vehicle. The bagged game does not rest on the vehicle but remains in the basket in the vertical position behind the vehicle.

23 Claims, 12 Drawing Sheets

(56) References Cited

U.S. PATENT DOCUMENTS

| | | | |
|---|---|---|---|
| 6,866,315 B2 | 3/2005 | Adams et al. | |
| 6,869,265 B2 | 3/2005 | Smith | |
| 7,156,246 B2 | 1/2007 | Sherrod | |
| 7,293,680 B1 | 11/2007 | Wawerski | |
| 7,293,951 B2 * | 11/2007 | Meeks | B60P 1/4407 414/462 |
| 7,296,959 B2 * | 11/2007 | Davis | B60R 9/06 224/401 |
| 8,656,615 B1 * | 2/2014 | Fournier | E01H 5/061 172/272 |
| 9,056,623 B1 * | 6/2015 | Woller | B62B 1/16 |
| 2002/0192062 A1 * | 12/2002 | Reed | B60P 1/4407 414/434 |
| 2003/0057245 A1 * | 3/2003 | Dean | B60R 9/06 224/519 |
| 2007/0252357 A1 | 11/2007 | Hoskins | |
| 2008/0292435 A1 * | 11/2008 | Turner | B60P 1/4407 414/462 |
| 2009/0245995 A1 * | 10/2009 | Bielech | B60R 9/06 414/800 |
| 2010/0111658 A1 | 5/2010 | Galliano et al. | |

\* cited by examiner

TRANSPORTATION APPARATUS FOR QUARRY AND METHODS OF USING SAME

CROSS-REFERENCE TO RELATED APPLICATIONS

This application claims the benefit of the U.S. provisional patent application entitled "Transportation Apparatus for Hunted Animals", having Ser. No. 62/115,673, filed Feb. 13, 2015, which is hereby incorporated by reference in its entirety as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention generally relate to apparatus, systems and methods for transporting quarry. More specifically, the present invention relates to apparatus, systems and methods for transporting quarry via a vehicle.

BRIEF SUMMARY OF THE INVENTION

Briefly stated, in one aspect of the present disclosure, an apparatus for transporting quarry and other hunted game animals after it is killed and/or bagged is provided. The apparatus includes a basket with retainers, a coupler, and a pair of handles for leveraging the load.

In another aspect of the present disclosure, a system for transporting quarry via a vehicle is provided. This system includes the apparatus, a vehicle and a stabilizer bar, the apparatus coupling to the rear of the vehicle via a coupler. The vehicle may be an all-terrain vehicle ("ATV"), in which case the apparatus attaches to the stabilizer installed on the rear of the ATV.

In a further aspect of the present disclosure, a method for loading quarry on to a vehicle is provided. This method includes attaching the apparatus to the vehicle, loading the apparatus with bagged game, rotating the handles so that the basket is inverted and placing the basket in a vertical position on the back of the vehicle, using the handles for leverage. In such embodiments, the bagged game does not rest on the vehicle but remains in the basket in the vertical position behind the vehicle. The bagged game may be loaded without winches or pulleys.

BRIEF DESCRIPTION OF THE SEVERAL VIEWS OF THE DRAWINGS

The foregoing summary, as well as the following detailed description of preferred embodiments of the disclosure, will be better understood when read in conjunction with the appended drawings. For the purpose of illustration, there is shown in the drawings embodiments which are presently preferred. It should be understood, however, that the disclosure is not limited to the precise arrangements and instrumentalities shown. In the drawings.

DETAILED DESCRIPTION OF THE INVENTION

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the disclosure described by the plural of that term. As used in this specification and in the appended claims, the singular forms "a", "an" and "the" include plural references unless the context clearly dictates otherwise, e.g., "a retainer" may include a plurality of retainers. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Figure 1A:
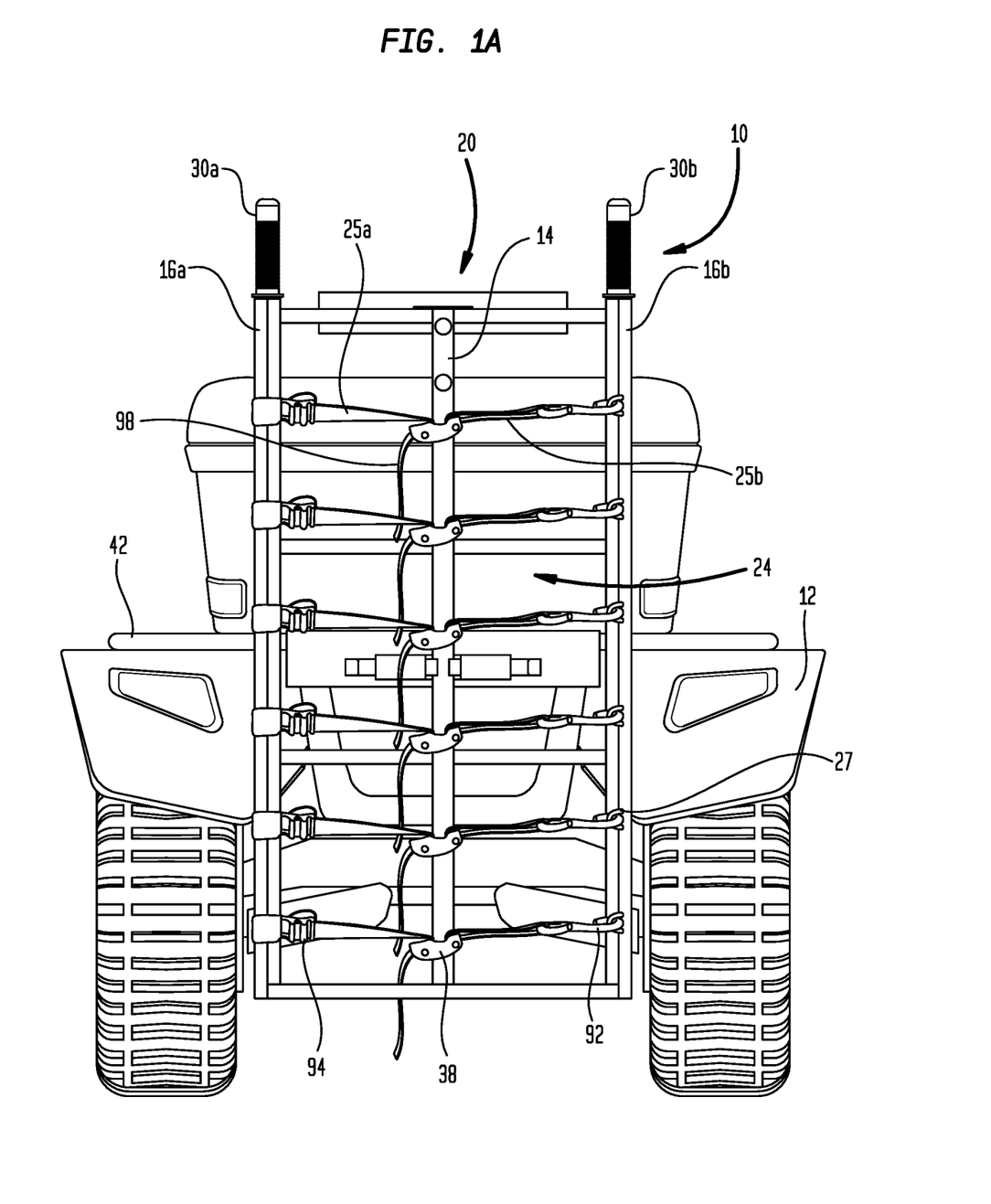
FIGS. 1A and 1B are rear and side views, respectively, of an apparatus for transporting quarry coupled to the rear of a vehicle in accordance with one embodiment of the present disclosure.
Figure 1B:
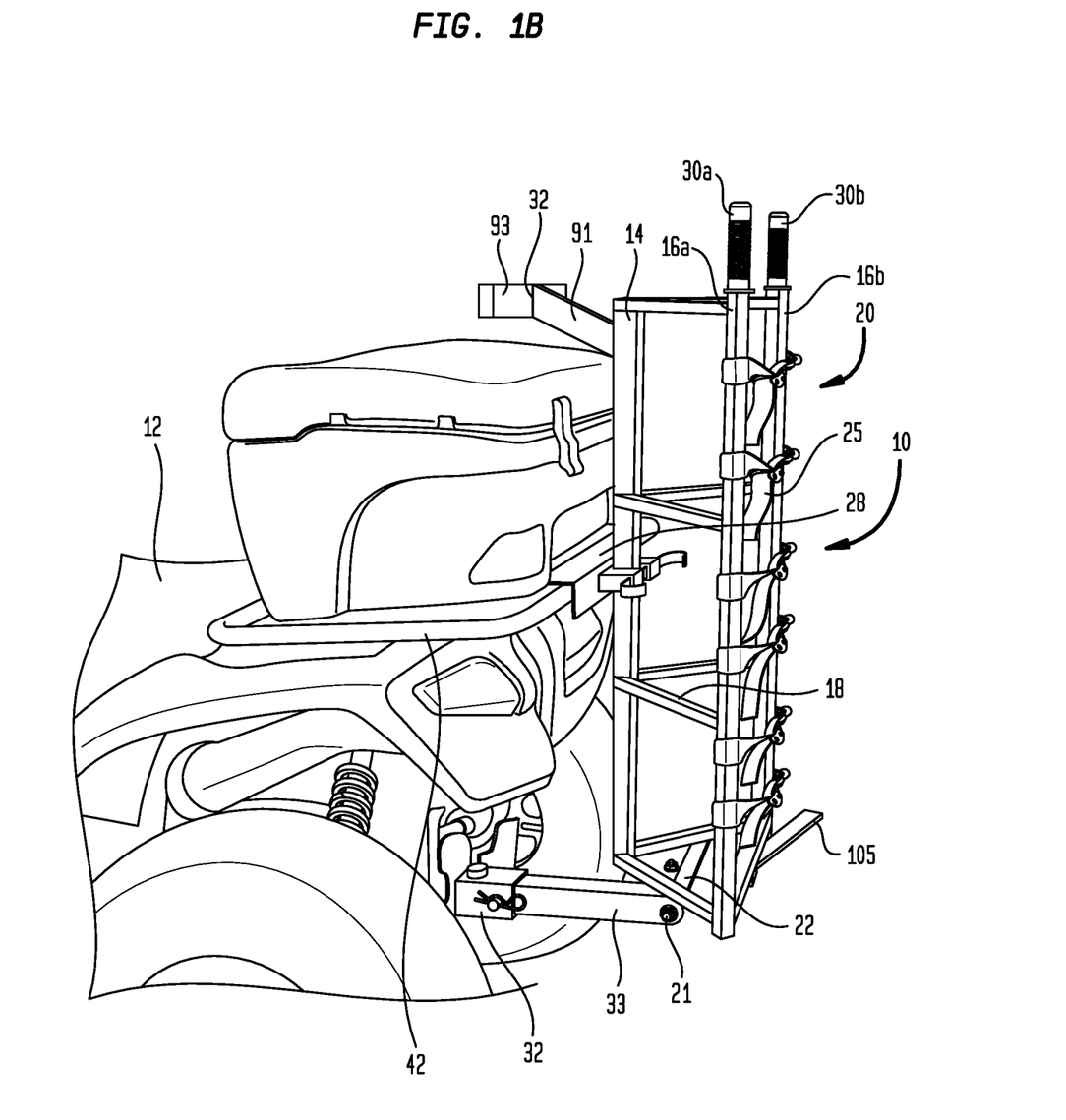

FIGS. 1A and 1B depict an apparatus 10 for transporting quarry coupled to the rear of a vehicle 12 such as an ATV in accordance with one embodiment of the present disclosure. Although the invention is described herein at being attached to an ATV, it may be used with other vehicles without departing from the scope hereof.

In the embodiment depicted in FIGS. 1A and 1B, apparatus 10 includes, inter alia, basket 20, handles 30, stabilizer 28, and a coupler 26. In the depicted embodiment, basket 20 is substantially V-shaped and is formed from a center support 14, a pair of side supports 16a and 16b, a plurality of V-shaped struts 18, a base platform 22, and webbing 24. In the depicted embodiment, center support 14 is a hollow metal support having a substantially square cross section. It is coupled to a pair of side supports 16a and 16b via a plurality of substantially V-shaped struts 18. In the depicted embodiment, side supports 16a and 16b include a plurality of approximately equidistantly spaced retention mechanism retainers 27 on the rearwardly facing surface of side supports 16a and 16b. Retention mechanism retainers 27 are in the form of a substantially tubular metal section (e.g., a welded oval opening) that extends from the respective side support 16 such that a completely enclosed substantially circular or oval opening 29 (Best seen in FIG. 4B) is formed between retention mechanism retainer 27 and side support 16. When retention mechanism 92 is attached through opening 29 as discussed in greater detail below, the respective retention mechanism system 23 is held in place such that it traverses the face of basket 20. Similarly, the respective retention mechanism system 23 may be removed from the face of basket 20 by unhooking retention mechanism 92 from retention mechanism retainer 27/opening 29. However, alternate methods of affixing and removing webbing 24 or individual retention mechanism systems 23 may be substituted without departing from the scope of the present invention.

Additionally, in the depicted embodiment, retention mechanism retainer 27 also prevents or minimizes the potential that retention mechanism 92 and the webbing 24 to which it is coupled, or the components thereof, move longitudinally along side support 16 for any substantial distance. In this manner, retention mechanism retainers 27 act to hold its respective retention mechanism system 23 at the desired location of basket 20. In the depicted embodiment, retention mechanism retainers 27 operate to keep the plurality of retention mechanism systems 23 substantially equidistantly spaced along the longitudinal extent of side support 16 as best seen in FIG. 1A. This is one method of maintaining webbing 24 in its desired location, but alternate forms of retention mechanism retainers 27 and alternate locations for retention mechanism retainers 27 may be substituted without departing from the scope hereof.

In the depicted embodiment, webbing 24 is adjustable and includes a plurality of retention mechanism systems 23, which are coupled to both first and second side supports 16a and 16b in a manner in which they collectively traverse the open face of the basket (i.e., the area opposite center support 14 and located between first and second side supports 16a and 16b). In this exemplary embodiment, each retention mechanism system includes two straps 25a and 25b, one tightening fastener 38, one retention fastener 94, and one retention mechanism 92. In this exemplary embodiment, straps 25 are nylon straps, tightening fasteners 38 are adjustable strap buckles, and retention fasteners 94 are strapless buckles.

In the depicted embodiment and as best seen in FIG. 1A, retention mechanism 92 is in the form of an S-hook. Strap 25b is coupled to the S-hook by passing an end of a strap through an enclosed end of the S-hook and through one end of tightening fastener 38. The two ends of strap 25b are then sewn together such that a closed loop is formed. Similarly, a first end of strap 25a is passed through the opposite end of tightening fastener 38, then through retention fastener 94, then through opening 29 of retention mechanism retainer 27, around vertical support 16a, and back through retention fastener 94. In some embodiments, the second end of strap 25a is in the form of a loop 98, which assists the user in tightening webbing 24; however, loop 98 is not required to implement the present invention. Loop 98 may be formed by simply sewing the strap such that a loop is formed. This arrangement allows the user to operate the retention fastener 94 such that the straps 25a and 25b/webbing 24 may be moved to a position in which they do not obstruct the opening of basket 20, thereby allowing the quarry to be loaded into the basket 20 as discussed in greater detail below. Although retention fastener 94 is a hook that is removed from an opening such as opening 29, alternate retention fasteners may be substituted without departing from the scope hereof. Tightening fastener 38, retention fastener 94, and/or retention mechanism 92 also allow the user to tighten and loosen straps 25a and 25b relative to each other. In this manner, the user is able to adjust individual retention mechanism systems 23 and webbing 24 as a whole. Although the depicted embodiment includes adjustable straps 25/webbing 24, alternate embodiments are envisioned in which the straps are not adjustable. For example, each retention mechanism system 23 could be substituted with a single strap for which a first end is coupled to side support 16a and a second end is coupled to side support 16b. This is one method of creating webbing 24, however, alternate methods may be substituted without departing from the scope of the present invention including, without limitation, non-adjustable webbing, webbing incorporating Velcro®, rope webbing, mesh webbing.

Figure 4A:
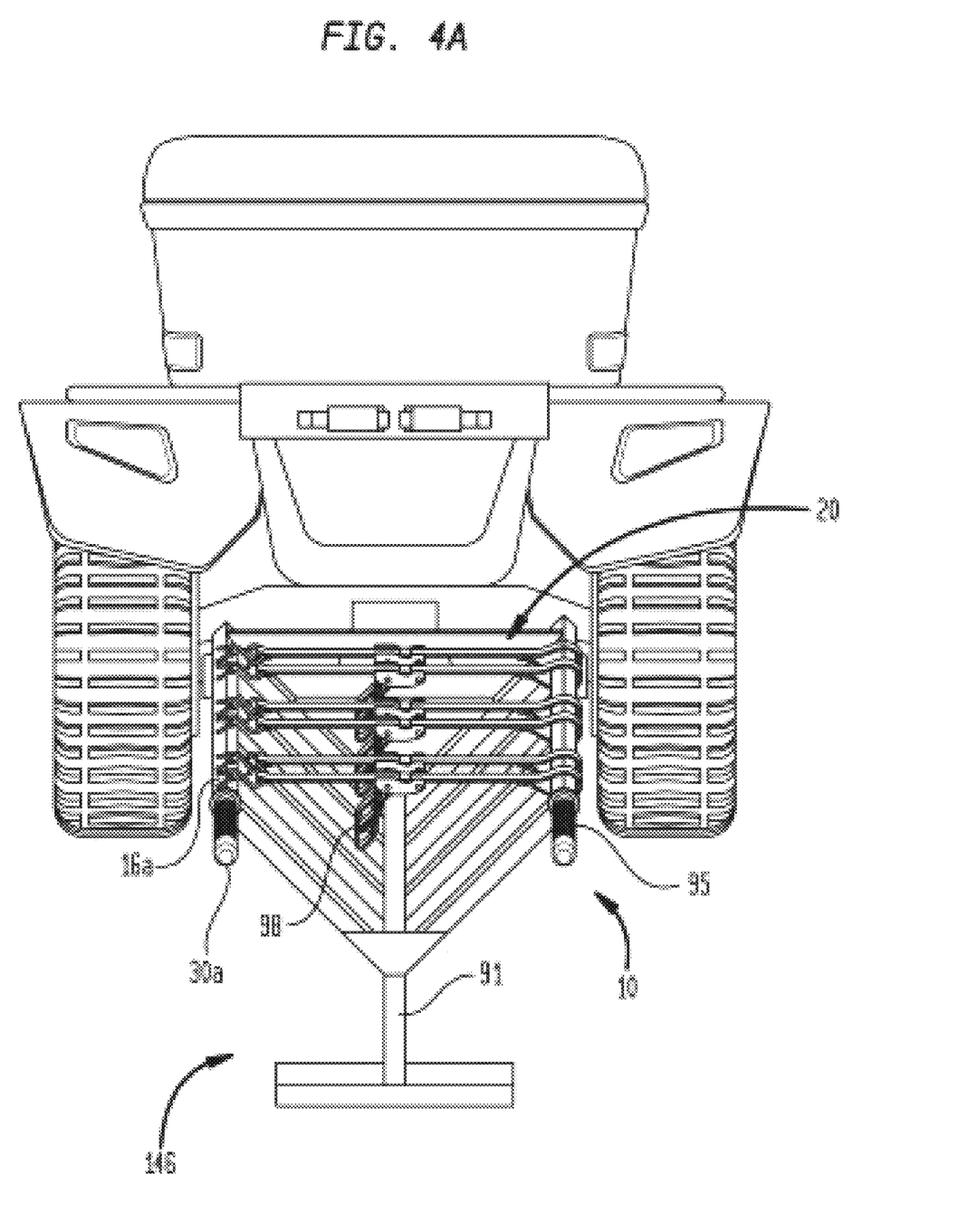
FIG. 4A is a rear view of the basket in a horizontal position in accordance with the embodiment of the present disclosure depicted in FIGS. 1-3.
Figure 4B:
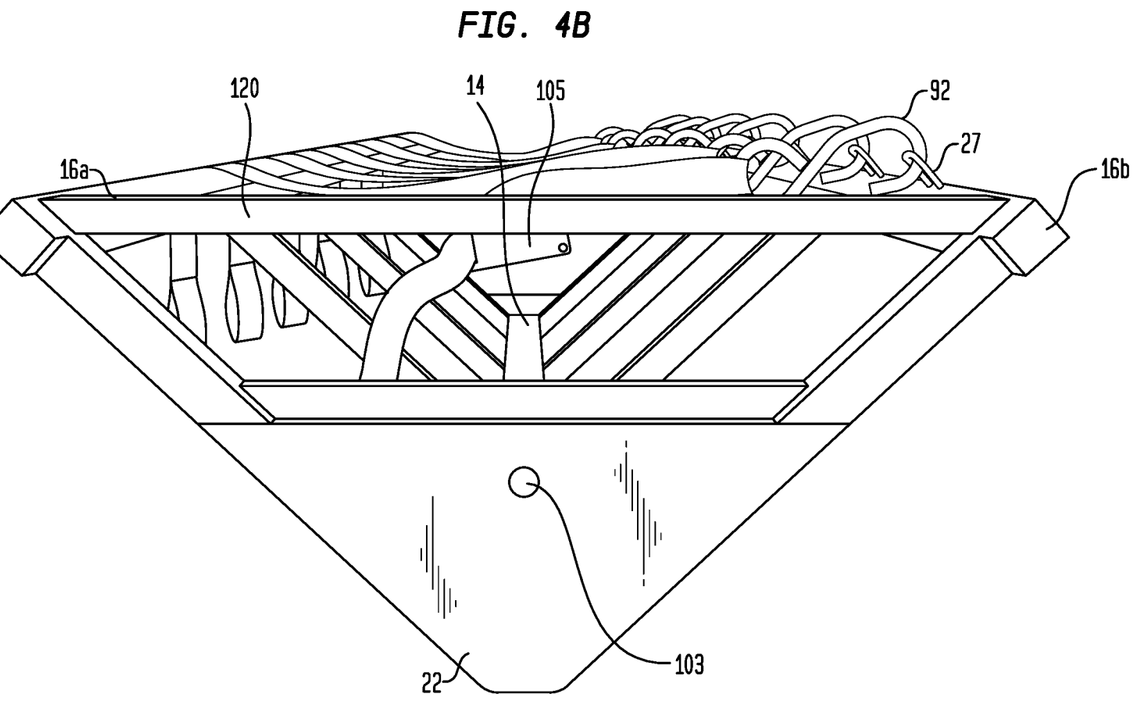
FIG. 4B is a bottom view of the basket in a horizontal position in accordance with the embodiment of the present disclosure depicted in FIGS. 1-3.

In the depicted embodiment and as best seen in the bottom view of FIG. 4B, basket 20 includes a base platform 22. In the depicted embodiment, base platform 22 is a substantially triangular piece of metal that extends internal to and between the bottommost struts 18 throughout the rear half of basket 20 and additionally a bar 120 that extends latitudinally between the bottom ends of side supports 16. The triangular portion of base platform 22 includes aperture 103, through which basket 20 is attached to coupler 26 as described in greater detail herein. Base platform 22 helps to retain the quarry within the basket 20. In the depicted embodiment, aperture 103 is located in the approximate horizontal midpoint of platform 22 proximal to the front edge thereof. However, alternate locations may be substituted without departing from the scope hereof. Also, alternate base platforms may be substituted without departing from the scope hereof. It is also understood by one of ordinary skill in the art that basket 20 may be alternately formed without departing from the scope hereof. For example, basket 20 may be formed with non-V shapes including, without limitation, a less angular U-shape with similarly shaped struts.

As best seen in FIG. 1B, the depicted embodiment of the present invention includes rest 105. In the depicted embodiment, rest 105 extends upwardly and outwardly from bar 120 of base platform 22 of basket 20 at an angle of approximately 45 degrees. The width of rest 105 is approximately one fifth the width of bar 120 and the height is approximately equal to the width. Rest 105 helps to retain quarry in basket 120 during transportation and prevents or minimizes the possibility that the quarry will slide from the bottom thereof. Alternate forms of rest 105 may be substituted without departing from the scope hereof.

Figure 2A:
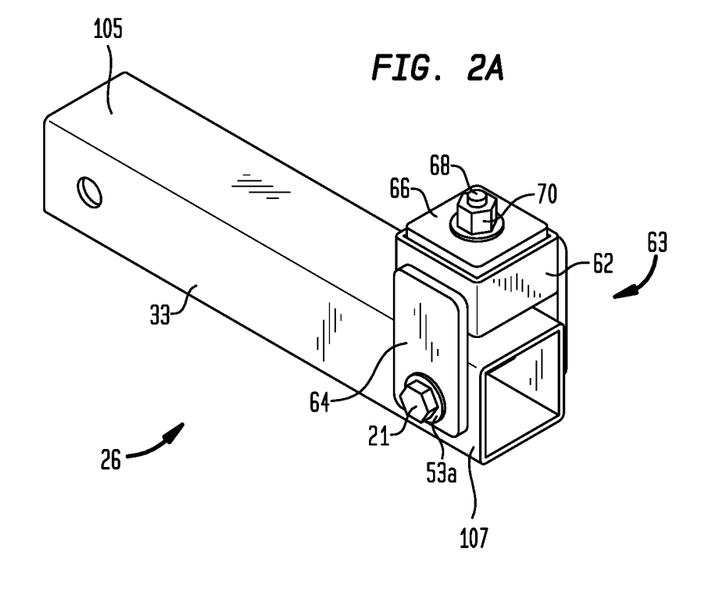
FIGS. 2A and 2B are perspective and exploded views of a coupler for coupling the apparatus to a vehicle in accordance with one embodiment of the present disclosure.
Figure 2B:
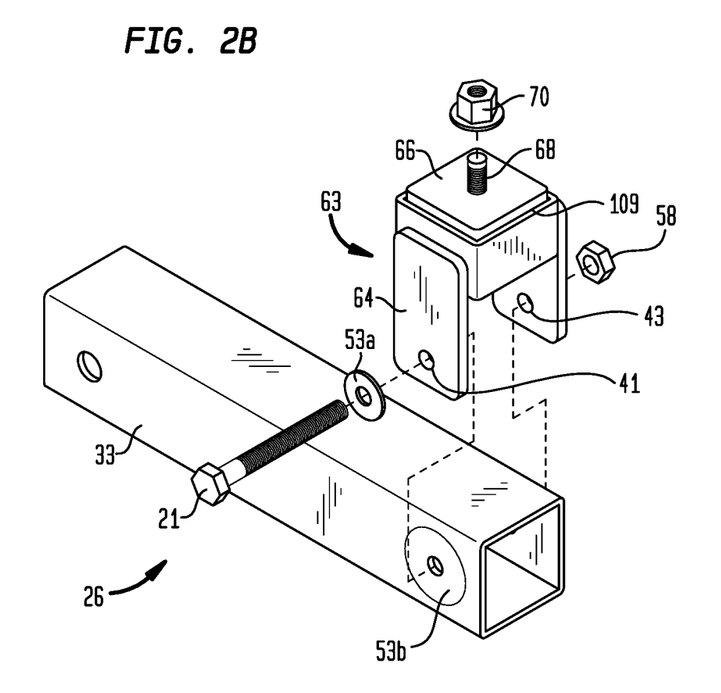

Referring now to FIGS. 2A and 2B, depicted are perspective and exploded views, respectively, of a coupler 26 for coupling the apparatus to the hitch 32 (FIG. 1B) of a vehicle 12a in accordance with one embodiment of the present disclosure. Hitch 32 is typically integral to vehicle 12 or may be added on by the vehicle owner post purchase. As seen in FIGS. 2A and 2B, in the depicted embodiment, coupler 26 includes horizontal support 33, joint 21, and basket support 63. In the depicted embodiment, basket support 63 has a substantially square body 62 including a substantially square recess 109 on its top surface and two flanges 64 extending downward and from opposing sides of square body 62. A threaded extension 68 is welded to the bottom, approximate midpoint of recess 109 and the length of the extension 68 is such that it extends beyond basket support 62 and bumper 66, the latter of which is also substantially square and is press fit into recess 109. However, in an alternative embodiment, extension 68 is a bolt passing through an aperture in the bottom of recess 109 such that the proximal portion of the head of the bolt abuts the external surface of basket support and the shaft of the bolt passes through the aperture. The shaft then extends beyond bumper 66 in the same manner as shown for threaded extension 68. Extension 68 passes through an aperture centrally located in bumper 66 and extension retainer 70 is threaded to the distal end of extension 68. In the depicted embodiment of the present invention, extension 68 is a bolt, extension retainer 70 is a nut, and the head of the bolt is welded to a substantially central point on the bottom of recess 109. However alternate extensions may be substituted without departing form the scope hereof. Extension 68 and extension retainer 70 allow basket support 63 to be coupled to basket 20 as depicted in FIG. 1B. This coupling is performed by removing extension retainer 70 from extension 68, passing extension through aperture 103 of basket 20 from the bottom side of basket 20 until the outwardly facing surface of bumper 66 is flush against the downwardly facing surface of basket 20 and then tightening extension retainer 70 on the distal end of extension 68 until the point at which basket 20 is firmly coupled to coupler 26 yet still able to rotate relative to the axis of extension 68. Bumper 66 eliminates noise and damage that would otherwise be caused due to the rubbing of two metal pieces, particularly during transportation of the basket. However, alternate embodiments are envisioned in which bumper 66 is eliminated. Also, alternate forms of basket support 63 may be substituted without departing from the scope hereof.

Horizontal support 33 is of similar size and construction as central support 14 and it has a first end 105 configured to adapt to a standard hitch such as hitch 32 as is known in the art. The second end 107 of horizontal support 33 and the distal ends of flanges 64 both include two aligned apertures 41 and 43, respectively, on the lateral sides thereof. In the depicted embodiment, horizontal support 33 is rotatably joined to basket support 63 via joint 21. Joint 21 includes a bolt 21, washers 53, and nut 58 which may be passed through apertures 41 and 43 when flanges 64 and horizontal support 33 are positioned such that the apertures align (i.e., the flanges 64 are passed over the second end of horizontal support 33 until the apertures align). When the user wishes to maintain the position of the basket relative to the horizontal support 33, the user loosens nut 58 to allow the basket to rotate. Once the basket is in the desired position, the nut may be tightened in order to retain the basket in the desired position. However, alternate embodiments are envisioned in which the basket is always able to rotate freely relative to joint 21 and basket 20 is held in place via stabilizer 28 only. Also, alternate joints may be substituted without departing from the scope of the present invention.

Coupler 26 allows rotation of basket 20 between a substantially horizontal and substantially vertical position while also allowing basket 20 to be rotated three hundred sixty degrees around an axis of rotation aligned with extension 68. That is, coupler 26 allows basket 20 to rotate in a clockwise or counterclockwise direction around such axis when it is located in its substantially horizontal position as described in greater detail herein.

Figure 3:
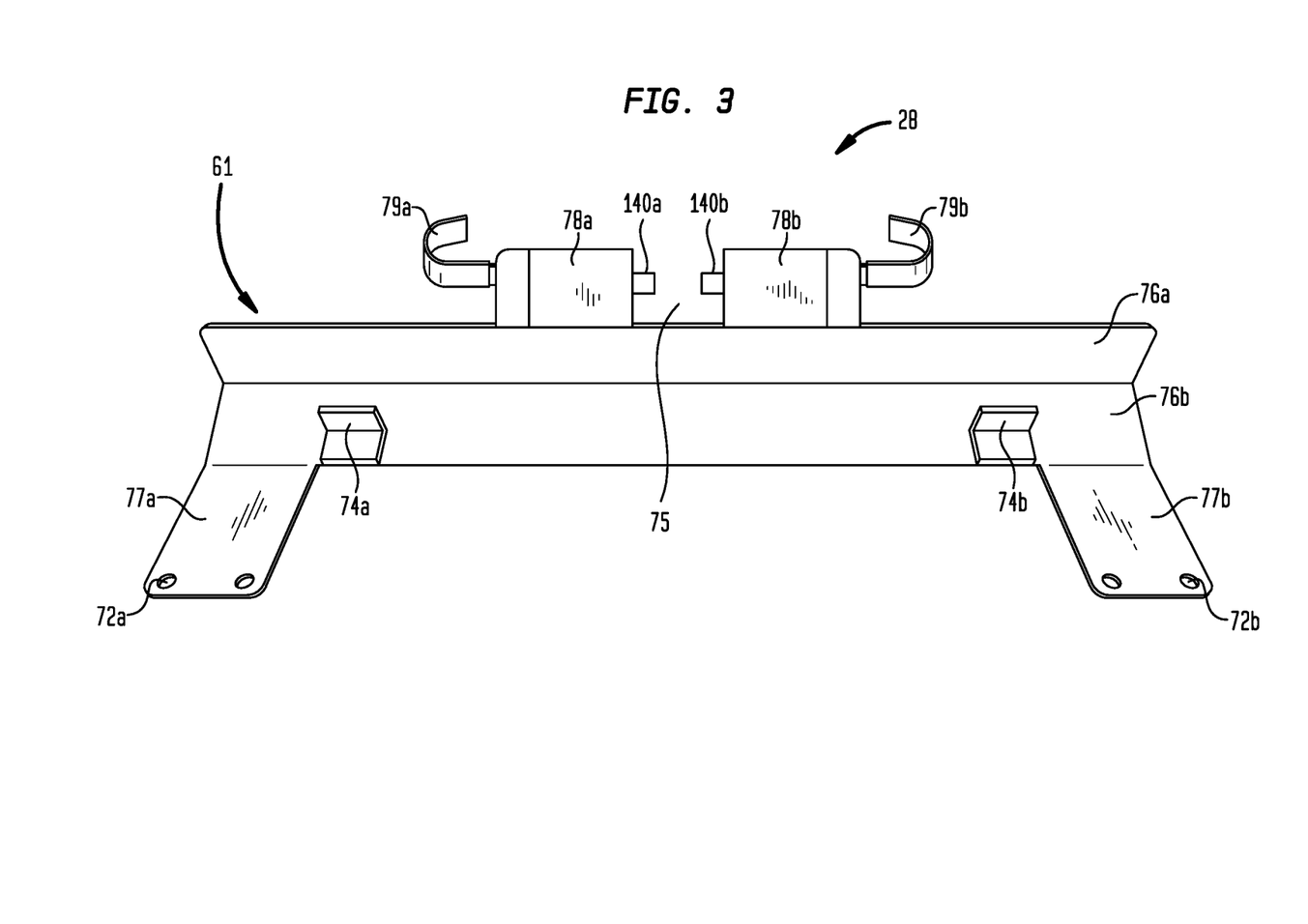
FIG. 3 is a bottom view of a stabilizer for use in coupling the apparatus to a vehicle in accordance with one embodiment of the present disclosure.

Referring next to FIG. 3, depicted is a bottom view of an optional stabilizer 28, which provides a second point of attachment of the apparatus 10 to the vehicle 12. The body 61 of stabilizer 28 is configured to couple to rear rack 42 of vehicle 12. In the depicted embodiment of the present invention, body 61 includes substantially rectangular top 76b and rear 76a, which are located substantially perpendicular to each other. Top 76b has two substantially rectangular flanges 77 extending in a substantially planar manner from the latitudinal ends of top 76b. The distal ends of flanges 77 include pairs of apertures 72. Top 76b also includes tabs 74a and 74b, which are located slightly inward of flanges 77 and are perpendicular to top 76b such that they are also parallel with rear 76a. That is, when stabilizer 28 is in its normal position, tabs 74a and 74b extend downward.

Two central support retainers 78a and 78b are located on the rear facing side of rear 76a. In the depicted embodiment of the present invention, retainers are finger pull latches with reverse bolt as manufactured by Allegis and having part no. 11-565697 ZN. Retainers 78a and 78b are equipped with releases 79a and 79b, respectively, which retract strikers 140 into the body of retainer 78 when the releases 79 are pulled away from the body of the respective retainer 78. Strikers 140 return to their original position upon release of releases 79. However, other retainers may be substituted without departing from the scope hereof.

The length of body 61 is such that either end of body 61 may be coupled to a respective support on rear rack 42. However, alternate body forms may be substituted without departing from the scope hereof.

Body 61 may be coupled to rear rack 42 as shown in FIG. 1B by placing the stabilizer 28 on rear rack 42 such that the rearward bar of rear rack 42 is located in the cavity 75 between the rearwardly facing surface of rear 76a and the inwardly facing surface of tabs 74. Stabilizer 28 is then fastened to rear rack 42 via fasteners such as carriage bolts, which pass through apertures 72 and corresponding apertures in rear rack 42. However, fasteners other than carriage bolts may be substituted without departing from the scope hereof including, without limitation, U-shaped clamps. The U portion of the fastener could be placed over a bar of rear rack 42 and then the ends of the fastener are passed through apertures 72 such that the bar of rear rack 42 is clamped between the U-shaped clamp and flange 77. Nuts or the like are then threaded onto the U-shaped clamps to retain stabilizer 28 affixed to rear rack 42.

Strikers 140 of stabilizer 28 are located such that they align with central support 14 of basket 20. Therefore, when basket 20 is rotated to a substantially vertical position, central support 14 applies pressure to the angled rearward sides of strikers 140, thereby causing them to retract to the extent necessary to allow the central support 14 to pass completely through the strikers. Once the central support 14 is located in cavity 75, which is located between the rear 76a and strikers 140, strikers 140 retract to their original position, thereby retaining central support 14, and consequently basket 20, in its substantially vertical position. Basket 20 will remain in this substantially vertical position until the strikers are retracted via the user pulling latches 79 away from the central support 14. Once the strikers are retracted, the basket may be lowered from its substantially vertical position. However, alternate forms and methods for coupling central support 14 to stabilizer 28 may be substituted without departing from the scope hereof.

Figure 5:
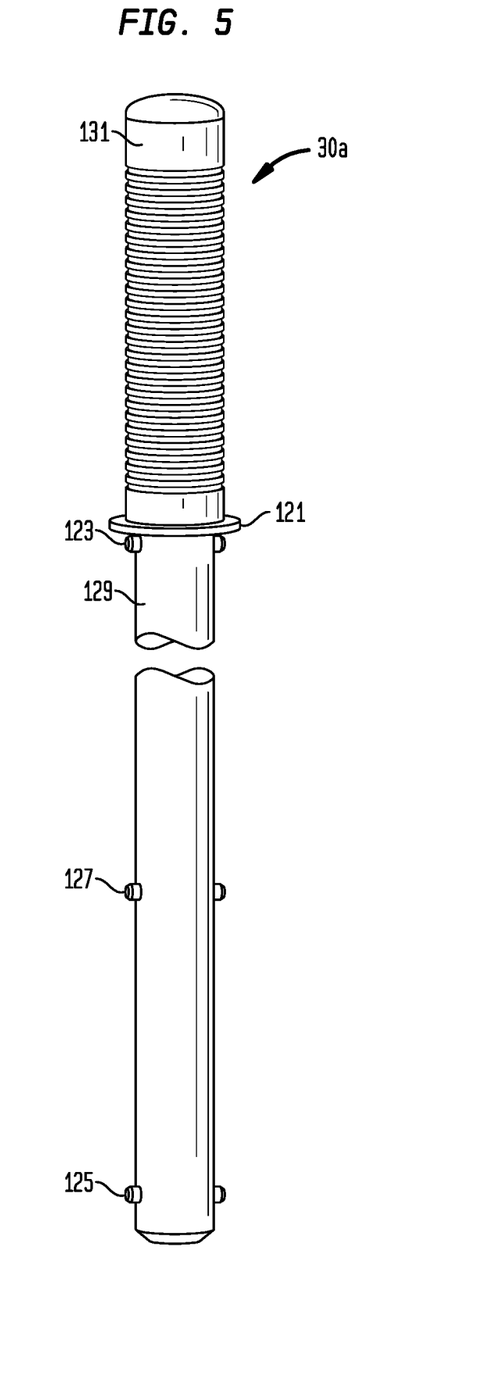
FIG. 5 is a front view of a handle in accordance with the embodiment of the present disclosure depicted in FIGS. 1-3.

Turning next to FIG. 5, depicted is a front view of a handle 30 in accordance with the depicted embodiment of the present disclosure. Handles 30 include a substantially cylindrical body 129 having two pairs of stops 125 and 127 at a first end and a grip 131, washer 121, and stop 123 at a second end. During manufacturing, each handle 30 is inserted into a respective side support 16 such that stops 125 and 127 are located in opposing corners of the substantially square side supports. This configuration prevents rotation of the handles within the side support, thereby providing more stability of the handles during use of apparatus 10. The tops of side supports 16 are then welded to provide an upper surface that retains handles 30 within side supports 16 by providing a surface that prevents stops 125 and 127 from passing out of the interior of side supports 16 while allowing handles to be raised and lowered along the axis of side supports until the point at which stops 127 contact the upper surface of the respective side support 16.

The end of handles 30 opposite stops 127 and 125 include a rubber grip 131 to provide comfort to the user when gripping the handle. The proximal end of grip 131 includes a metal washer 121, which is held in place between grip 131 and stop 123. Washer 121 is sized such that it is larger than the top opening of the side support 16 in which it is located. This relative sizing prevents the handle from retracting into side support 16 fully such that the handle 30 is always external to the side support 16 and thereby readily accessible to the user. In the depicted embodiment of the present invention, stops 123, 125, and 127 are roll pins that pass through opposing apertures in handle body 129, however, alternate versions of stops may be substituted without departing from the scope of the present invention.

In some embodiments of the present invention, washer 121 is a metal washer. In such embodiments, a rubber washer may be located between washer 121 and stop 123 in order to cushion metal washer 121 from striking the upper end of side supports 16, thereby alleviating wear and noise caused by metal contacting metal. However, alternate forms of washers including, without limitation, rubber washers may be substituted without departing from the scope hereof. Also, alternate versions of handles may be substituted without departing from the scope hereof.

Referring now to FIG. 4A, depicted is a rear view of basket 20 in a horizontal position in accordance with the embodiment of the present disclosure depicted in FIGS. 1-3. Extending rearwardly from the upper end of center support 114 is a substantially T-shaped support 146. The base 91 of the support 146 angles upwardly as it extends towards the vehicle 12 and away from basket 20 as best seen in FIG. 1B. Top 93 of support 146 extends laterally in a substantially perpendicular manner in both directions from base 91 and it is substantially parallel to the ground when basket 20 is located in a substantially vertical position. The base 91 is configured to support basket 20 and to maintain basket 20 above the ground when the basket is in a substantially horizontal position. Top 93 also may form a second pair of handles for grasping when manipulating the basket 20. Top 93 is also configured to provide a rest for base 91.

Figure 6A:
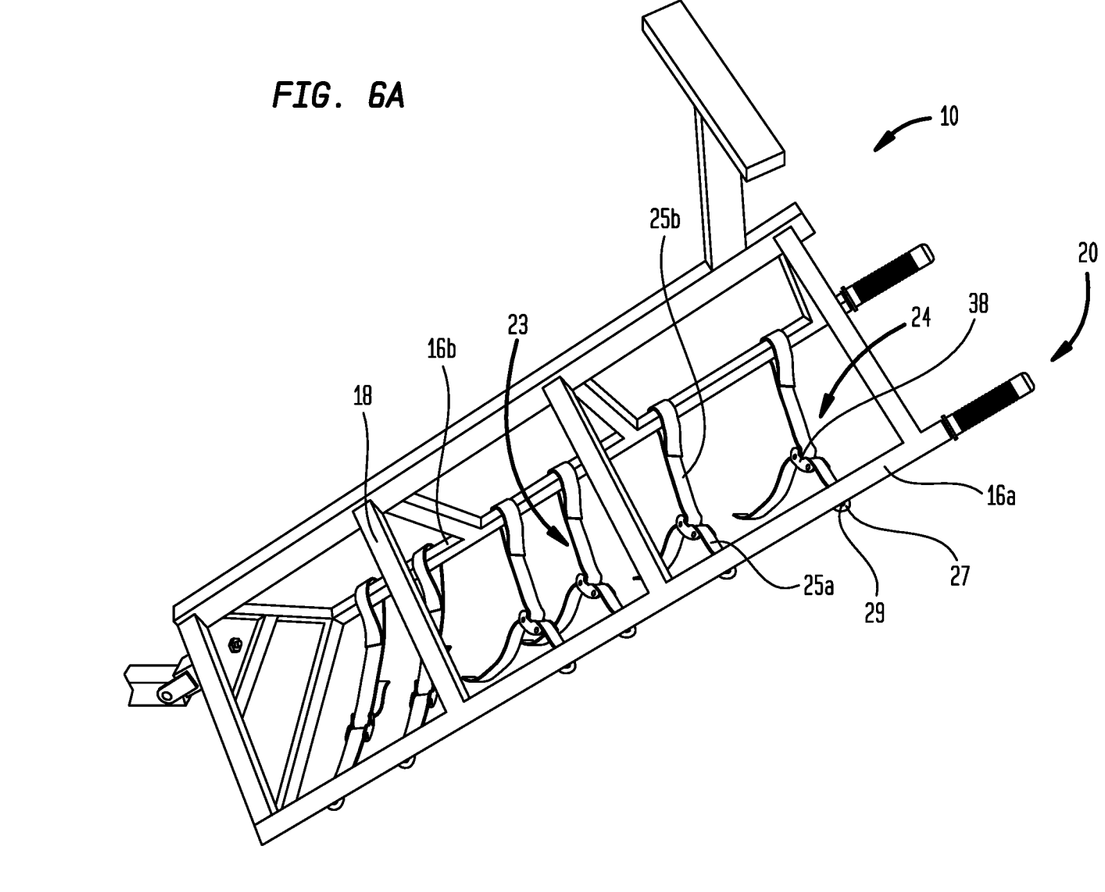
FIGS. 6A-6E demonstrate a method for transporting quarry, in accordance with one embodiment of the present disclosure.
Figure 6B:
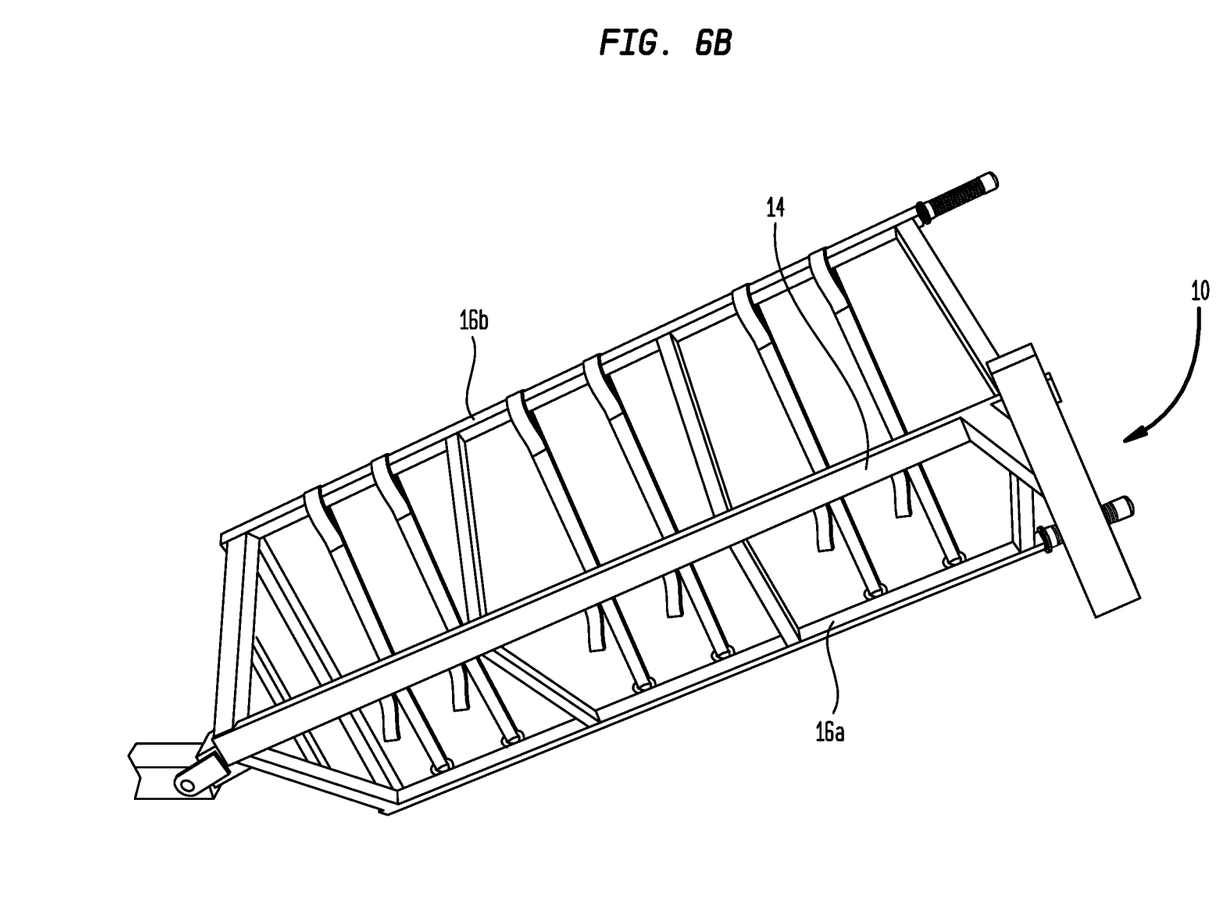
Figure 6C:
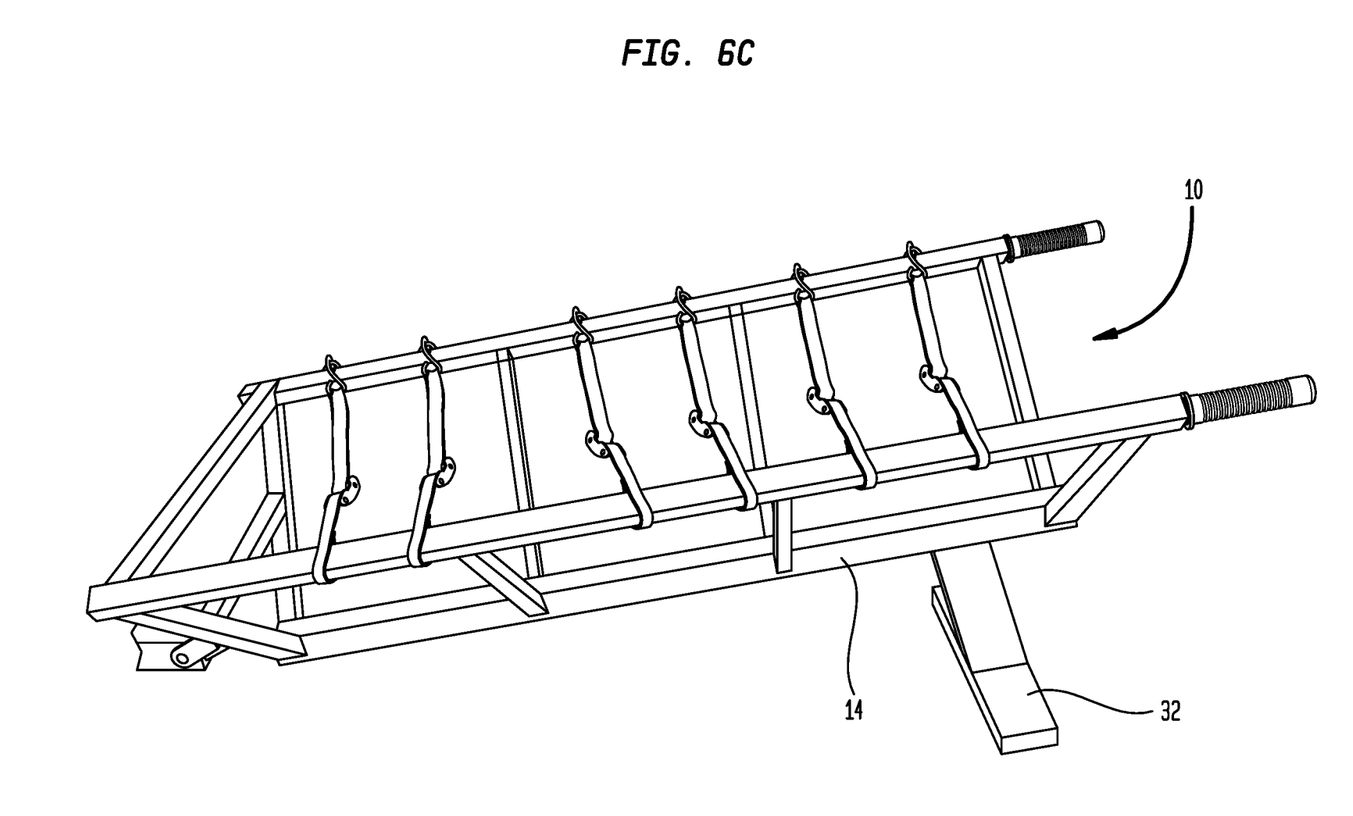

Referring now to FIGS. 6A-6E, depicted is a method of transporting quarry using the apparatus 10 as shown and described relative to FIGS. 1A-5. First, as depicted in FIG. 6A, the user pivots the basket 20 from a substantially vertical position to a substantially horizontal position. In the depicted embodiment, this requires releasing center support 14 from stabilizer 28 and indexing coupler 26 to a rotational position, if needed. Center support 14 may be released by, for example, pulling latches 79a and 79b away from strikers 140. Next, as depicted in FIG. 6B, the user rotates basket 20 clockwise or counterclockwise until center support 14 is below basket 20 and at its bottommost point as depicted in FIG. 6C. The user continues to lower basket 20 until it is resting on the ground and supported at a height therefrom by support 146.

Figure 6D:
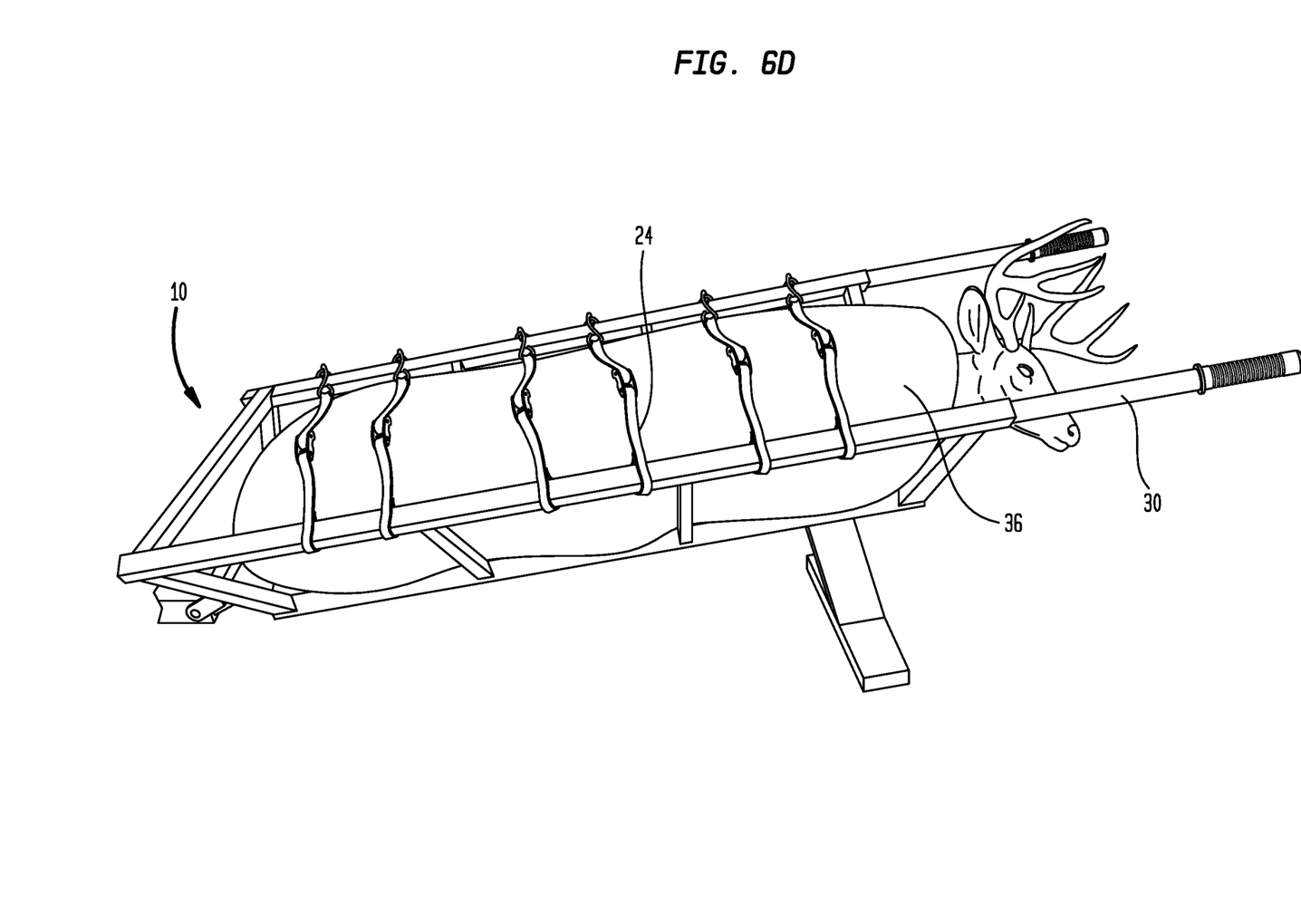

Once apparatus 10 is resting upon support 146 or an equivalent version thereof, the webbing 24 is removed from the removable side of adjacent side support 16b. In the embodiment of the present invention depicted in FIGS. 1 through 5, the removable side of apparatus 10 is the side adjacent side support 16b and the webbing 24 is removed by removing retention mechanisms 92 from retention mechanism retainer 27 (e.g., unhooking retention mechanism 92 from strap retainer 27). Similarly, the area adjacent side support 16a is the stationary side as the webbing 24 is not typically removed from side support 16a. After removal or opening of webbing 24, quarry 36 is loaded into basket 20 and atop central support and struts 18. When quarry 36 is in the desired position, it is fixed in place by fastening webbing 24 around quarry 36 until it is securely held within basket 20 as depicted in FIG. 6D. In the depicted embodiment, webbing 24 is fixed in place by inserting retention mechanism 92 through opening 29 and then pulling loop 98 until the retention mechanisms 25a and 25b have obtained the desired tightness relative to quarry 36.

In some alternate methods, the user locates the vehicle 12 directly adjacent to quarry 36 prior to beginning the process of loading quarry 36 into basket 20 to allow basket 20 to be lowered to its substantially horizontal position directly above the quarry, thereby eliminating or minimizing movement of the quarry, which may have considerable weight. In such embodiments, quarry 36 may be fastened into basket 20 prior to rotation thereof as shown in FIGS. 6B and 6C. Also, in such embodiments, once basket 20 is rotated with quarry 36 therein, webbing 24 may be retightened to ensure a secure fit.

Figure 6E:
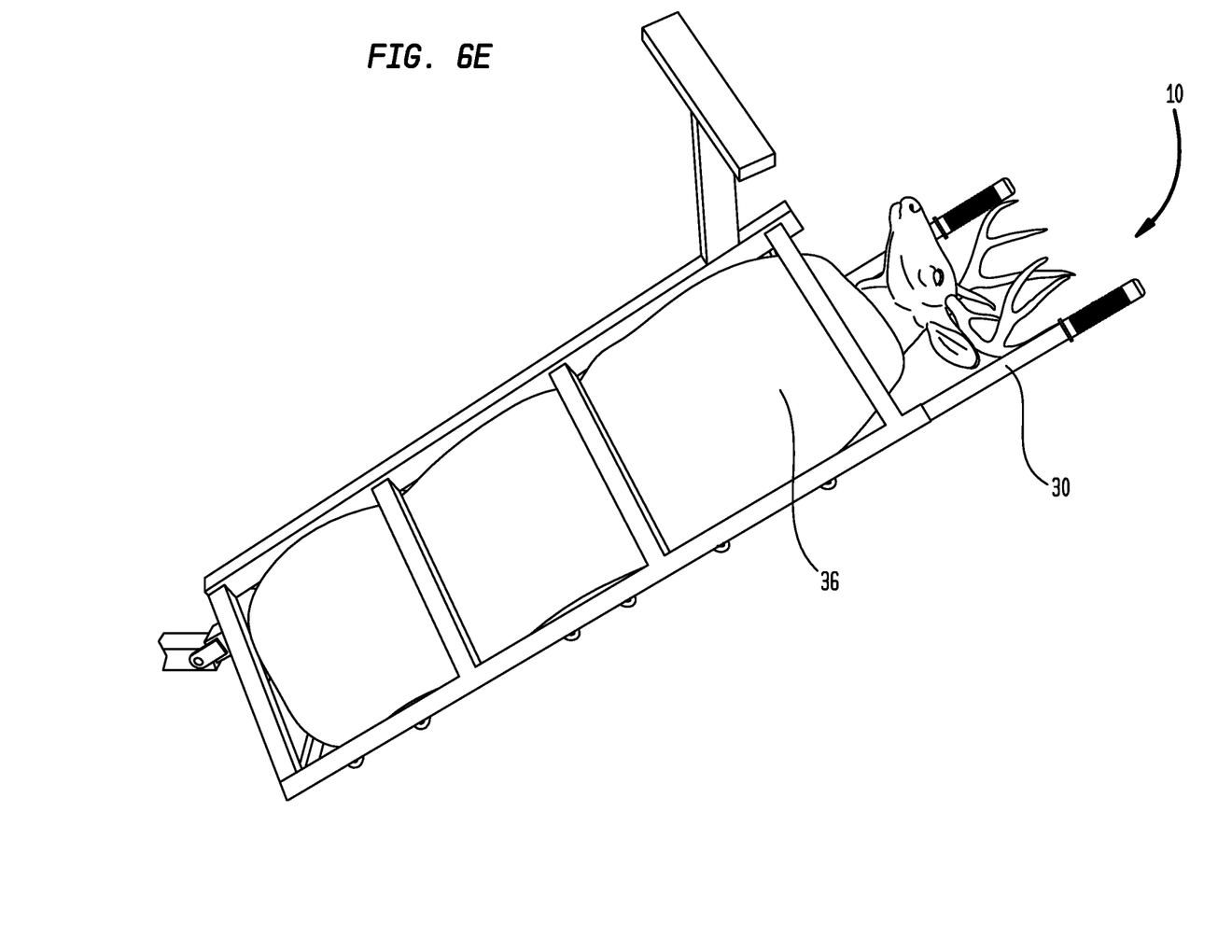

After quarry 36 is securely fixed into basket 20, the user pulls handles 30a and 30b from side supports 16a and 16b and extends them as shown in FIGS. 6D and 6E. In the embodiment of the apparatus having a T-bar support, the user may alternatively grasp the handles on the T-bar support. Thereafter, using leverage, the user may more easily lift basket 20 toward vehicle 12 as depicted in FIG. 6D. The user then rotates the loaded basket 20 as shown in FIG. 6E and pivots basket 20 towards vehicle 12 to its substantially vertical position, ultimately locking the center support 14 to the stabilizer 28 on the back of the vehicle and, optionally, fixing coupler 26 in a fixed position.

Quarry 36 is now in a substantially vertical position on vehicle 12, not resting on the vehicle back or any portion of the vehicle, thereby keeping the vehicle relatively clean. Quarry 36 is able to be positioned without the need for pulleys or winches, using simple leverage. When at the desired destination, quarry 36 may be unloaded from apparatus 10 using the reverse steps.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An apparatus for transporting quarry in a substantially vertical position comprising: a basket having an open side adapted to have quarry be placed on the open side for transport, the basket extending between a basket first end and a basket second end defining a first axis, the basket including a primary support extending along a closed side of the basket, the closed side opposite the open side, and the basket further including a quarry retention mechanism extending along the open side of the basket, wherein the basket is adapted for transporting quarry in the substantially vertical position with the open side of the basket facing rearward during transport; and a coupler, the coupler configured to couple the basket to a hitch of a vehicle and to allow rotation of the basket between a substantially horizontal position and a substantially vertical position around a second axis, the coupler also configured to allow at least one of the group consisting of clockwise rotation of 90 degrees or greater of the basket around the first axis, counterclockwise rotation of 90 degrees or greater of the basket around the first axis, and combinations thereof to rotate the basket such that the primary support is oriented below the quarry retention mechanism, a coupler first end configured for coupling the coupler to the hitch of the vehicle, a coupler second end configured for coupling the coupler to the basket first end, the coupler and the basket adapted to transport quarry in a substantially upright position.

2. An apparatus according to claim 1 further comprising: a stabilizer.

3. An apparatus according to claim 2, wherein the stabilizer includes at least one cavity into which a portion of the basket may be placed for retention of the basket in a substantially vertical position, the stabilizer further including at least one stabilizer retention mechanism, the stabilizer retention mechanism including at least one release for removal of the basket from the cavity.

4. An apparatus according to claim 1 further comprising: at least one handle.

5. An apparatus according to claim 4, the at least one handle further comprising:
at least one stop.

6. An apparatus according to claim 1, the coupler further including:
a horizontal support for coupling the coupler to the hitch;
a basket support providing the at least one of the group consisting of clockwise rotation, counterclockwise rotation, and combinations thereof relative to the axis of the basket; and
a joint coupling the horizontal support to the basket support, the joint providing rotation of the basket between the substantially horizontal position and the substantially vertical position.

7. An apparatus according to claim 1, the basket further comprising:
a base platform located on a bottommost end of the basket when the basket is located in its substantially vertical position.

8. An apparatus according to claim 6,
wherein the basket support includes an extension;
wherein the basket support connects to the basket via passing the extension through an aperture in a base platform of said basket and affixing an extension retainer to a distal end of the extension.

9. An apparatus according to claim 1, the basket further comprising:
a rest for minimizing slippage of the quarry from the basket.

10. An apparatus according to claim 9, wherein the rest extends upwardly and outwardly from the primary support when the primary support is in a substantially vertical position at an angle of approximately 45 degrees.

11. An apparatus according to claim 1, wherein the primary support of the basket is coupled to a pair of side supports via a plurality of struts, the basket having a platform base located at the bottommost end of the basket when the basket is in a substantially vertical position, the basket having webbing, the webbing attaching between the pair of side supports and traversing the open side of the basket.

12. The apparatus according to claim 11, wherein the webbing includes at least one strap and at least one of the group consisting of a webbing tightening fastener, a webbing retention fastener, a webbing retention mechanism, and combinations thereof.

13. The apparatus according to claim 11, wherein the webbing is removably coupled to the basket via coupling and uncoupling of the webbing retention mechanism and the webbing retention mechanism retainer.

14. The apparatus according to claim 3, wherein the at least one handle is retractably contained within a side support of said basket.

15. The apparatus according to claim 1, wherein the basket includes a support for supporting the basket when the basket is in the substantially horizontal position.

16. The apparatus according to claim 15, wherein the support is T-shaped.

17. The apparatus according to claim 11, wherein each of the plurality of struts are substantially V-shaped and the basket is V-shaped.

18. A method of transporting quarry in a substantially vertical position comprising the steps of: providing a basket having an open side adapted to have quarry placed on the open side for transport, the basket extending between a basket first end and a basket second end defining a first axis, the basket including a primary support extending along a closed side of the basket, the closed side opposite the open side, and the basket further including a quarry retention mechanism extending along the open side of the basket, wherein the basket is adapted for transporting quarry in the substantially vertical position with the open side of the basket facing rearward during transport, and the basket coupled to a vehicle rear; pivoting the basket coupled to the vehicle rear from the substantially vertical position to a substantially horizontal position; rotating the basket 90 degrees or greater along the first axis of the basket until the open side of the basket is upwardly facing, the first axis extending from the basket first end to the basket second end, the basket first end being a bottommost end of the basket when the basket is in the substantially vertical position, and the basket second end being a topmost end of the basket when the basket is in the substantially vertical position; loading the quarry into the basket; affixing the quarry in place; rotating the basket 90 degrees or greater around the first axis of the basket until the open side of the basket is downwardly facing; pivoting the basket and the quarry from the substantially horizontal position to the substantially vertical position to transport the quarry upright in the substantially vertical position, with the open side of the basket facing rearward during transport.

19. A method of transporting quarry according to claim 18 further comprising the step of:
locking the basket and the quarry in said substantially vertical position.

20. A method of transporting quarry according to claim 18 further comprising the step of:
extending at least one handle of the basket to provide leverage for said pivoting of said basket, said rotating of said basket, and combinations thereof.

21. An apparatus according to claim 1 wherein the coupler second end includes a basket support engaged to the basket and a joint engaged with the basket support, such that the basket support pivots around the joint to affect rotational movement of the basket while in a substantially horizontal position.

22. A method of transporting quarry according to claim 18, wherein the steps of rotating the basket ninety degrees include loosening and tightening a joint engaged to the basket.

23. An apparatus for transporting quarry in a substantially vertical position comprising: a basket adapted for transporting quarry in the substantially vertical position and extending between a basket first end and a basket second end defining a first axis, the basket including a primary support extending along one side of the basket and a quarry retention mechanism extending along an opposite side of the basket; and a coupler, the coupler configured to couple the basket to a hitch of a vehicle and to allow rotation of the basket between a substantially horizontal position and the substantially vertical position around a second axis, the coupler also configured to allow at least one of the group consisting of clockwise rotation of 90 degrees or greater of the basket around the first axis, counterclockwise rotation of 90 degrees or greater of the basket around the first axis, and combinations thereof to rotate the basket such that the primary support is oriented below the quarry retention mechanism, a coupler first end configured for coupling the coupler to the hitch of the vehicle, a coupler second end configured for coupling the coupler to the basket first end, the coupler and the basket adapted to transport quarry in the substantially upright position; wherein the coupler further includes: a horizontal support for coupling the coupler to the hitch; a basket support providing the at least one of the group consisting of clockwise rotation, counterclockwise rotation, and combinations thereof relative to the axis of the basket; and a joint coupling the horizontal support to the basket support, the joint providing rotation of the basket between the substantially horizontal position and the substantially vertical position; wherein the basket support includes an extension; and, wherein the basket support connects to the basket via passing the extension through an aperture in a base platform of said basket and affixing an extension retainer to a distal end of the extension.

* * * * *